United States Patent
Adachi et al.

(10) Patent No.: US 12,458,327 B2
(45) Date of Patent: Nov. 4, 2025

(54) ULTRASONIC DEVICE, SEMICONDUCTOR DEVICE, AND METHOD OF CONTROLLING ULTRASONIC DEVICE

(71) Applicant: Socionext Inc., Kanagawa (JP)

(72) Inventors: Naoto Adachi, Yokohama (JP); Naoto Yoneda, Yokohama (JP); Masaya Tamamura, Yokohama (JP)

(73) Assignee: ABLIC INC., Nagano (JP)

( * ) Notice: Subject to any disclaimer, the term of this patent is extended or adjusted under 35 U.S.C. 154(b) by 370 days.

(21) Appl. No.: 18/312,332

(22) Filed: May 4, 2023

(65) Prior Publication Data

US 2023/0270419 A1 Aug. 31, 2023

Related U.S. Application Data

(63) Continuation of application No. PCT/JP2020/042629, filed on Nov. 16, 2020.

(51) Int. Cl.
*A61B 8/00* (2006.01)
*G01S 7/52* (2006.01)
*G01S 15/89* (2006.01)

(52) U.S. Cl.
CPC .............. *A61B 8/58* (2013.01); *A61B 8/4488* (2013.01); *A61B 8/5207* (2013.01); *G01S 7/5208* (2013.01); *G01S 15/8915* (2013.01)

(58) Field of Classification Search
CPC ....... A61B 8/58; A61B 8/4488; A61B 8/5207; A61B 8/54; A61B 8/56; G01S 7/5208; G01S 15/8915; G01S 7/52026

(Continued)

(56) References Cited

U.S. PATENT DOCUMENTS

| | | | |
|---|---|---|---|
| 5,590,658 A | | 1/1997 | Chiang et al. |
| 5,873,830 A | * | 2/1999 | Hossack ............. G01S 7/52085 600/447 |

(Continued)

FOREIGN PATENT DOCUMENTS

| | | |
|---|---|---|
| JP | 2005-102717 A | 4/2005 |
| JP | 2005-261593 A | 9/2005 |

(Continued)

OTHER PUBLICATIONS

International Search Report (ISR) dated Jan. 12, 2021 issued in International Patent Application No. PCT/JP2020/042629, with English translation.

*Primary Examiner* — Duy T Nguyen
(74) *Attorney, Agent, or Firm* — Rimon P.C.

(57) ABSTRACT

An ultrasonic device includes: oscillation elements to generate ultrasonic waves toward a subject, and generate voltages according to ultrasonic waves reflected by the subject; a switch to select voltages generated by a predetermined number of oscillation elements, from among the generated voltages; and semiconductor devices. Each semiconductor device includes: a first terminal to receive a second predetermined number of voltages different from voltages received by other semiconductor devices, among the selected voltages; a first adder to add data based on the second predetermined number of voltages; a second terminal to receive an addition result of data by the first adder of each of the other semiconductor devices; a second adder to add the addition results of the data received by the first adder and the data received by the second terminal; and an image generator to generate image data based on the addition result of the second adder.

1 Claim, 10 Drawing Sheets

(58) Field of Classification Search
USPC .......................................................... 438/24
See application file for complete search history.

(56) References Cited

U.S. PATENT DOCUMENTS

| | | | | |
|---|---|---|---|---|
| 2002/0117044 | A1* | 8/2002 | Sakurada | G10H 1/0058 |
| | | | | 84/645 |
| 2006/0253034 | A1 | 11/2006 | Fukukita | |
| 2008/0146929 | A1* | 6/2008 | Satoh | G01S 7/52084 |
| | | | | 600/443 |
| 2010/0217126 | A1* | 8/2010 | Yawata | A61B 8/14 |
| | | | | 600/443 |
| 2016/0367221 | A1* | 12/2016 | Igarashi | A61B 8/5207 |
| 2018/0070914 | A1* | 3/2018 | Yang | A61B 8/085 |
| 2019/0201042 | A1* | 7/2019 | Nott | A61B 34/76 |

FOREIGN PATENT DOCUMENTS

| | | |
|---|---|---|
| JP | 2006-129951 A | 5/2006 |
| JP | 2011-087948 A | 5/2011 |

\* cited by examiner

ULTRASONIC DEVICE, SEMICONDUCTOR DEVICE, AND METHOD OF CONTROLLING ULTRASONIC DEVICE

CROSS-REFERENCE TO RELATED APPLICATIONS

This U.S. non-provisional application is a continuation application of and claims the benefit of priority under 35 U.S.C. § 365(c) from PCT International Application PCT/JP2020/042629 filed on Nov. 16, 2020, which is designated the U.S., the entire contents of which are incorporated herein by reference.

TECHNICAL FIELD

The present disclosure relates to an ultrasonic device, a semiconductor device, and a method of controlling an ultrasonic device.

BACKGROUND ART

Ultrasonic devices that generate ultrasonic waves toward a living body and generate ultrasonic image data from ultrasonic waves reflected by the living body have been known. This type of ultrasonic device includes, for example, multiple subbeamformers that receive respective signals from a predetermined number of oscillation elements, adjusts amounts of delays of the signals by the multiple subbeamformers, and then, generates image data by outputting these to a main beamformer.

RELATED ART DOCUMENTS

Patent Documents

[Patent Document 1] Japanese Laid-Open Patent Application No. 2005-102717
[Patent Document 2] Japanese Laid-Open Patent Application No. 2005-261593

Recently, ultrasonic devices have become smaller and wireless; for example, ultrasonic probes that have built-in basic processing functions to generate ultrasonic images have been developed. In such ultrasonic devices, increasing the number of reception channels, which is the number of reception signals of ultrasonic waves (the number of oscillation elements) used for generating ultrasonic image data, results in higher quality of ultrasonic images, but consumes more power. Therefore, for example, mobile ultrasonic devices in which low power consumption is required to be driven by a battery, have fewer reception channels and lower ultrasonic image quality as compared to stationary ultrasonic devices.

The number of reception channels is determined when designing the ultrasonic device, based on required power consumption and required image quality of ultrasonic images. In addition, ultrasonic devices are designed individually according to the determined numbers of reception channels. Designing ultrasonic devices individually lengthens the design time of the ultrasonic devices, and increases the design cost and the manufacturing cost.

SUMMARY

According to one aspect in the present disclosure, an ultrasonic device includes: a plurality of oscillation elements configured to generate ultrasonic waves toward a subject, and generate voltages according to ultrasonic waves reflected by the subject; a switch configured to select voltages generated by a first predetermined number of oscillation elements, from among the voltages generated by the plurality of oscillation elements; and a plurality of semiconductor devices. Each of the plurality of semiconductor devices includes: a first terminal provided for receiving a second predetermined number of voltages different from voltages received by other semiconductor devices, among a first predetermined number of voltages selected by the switch; a first adder configured to add data based on the second predetermined number of voltages received by the first terminal; a second terminal configured to receive an addition result of data by the first adder of each of the other semiconductor devices; a second adder configured to add the addition result of the data received by the first adder and the addition result of the data received by the second terminal, and an image generator configured to generate image data based on the addition result of the second adder.

EMBODIMENTS FOR CARRYING OUT THE INVENTION

In the following, embodiments will be described with reference to the drawings.
According to the disclosed techniques, design of ultrasonic devices according to the required number of reception channels can be simplified, by installing the number of semiconductor devices corresponding to the number of reception channels determined by the design.

First Embodiment

Figure 1:
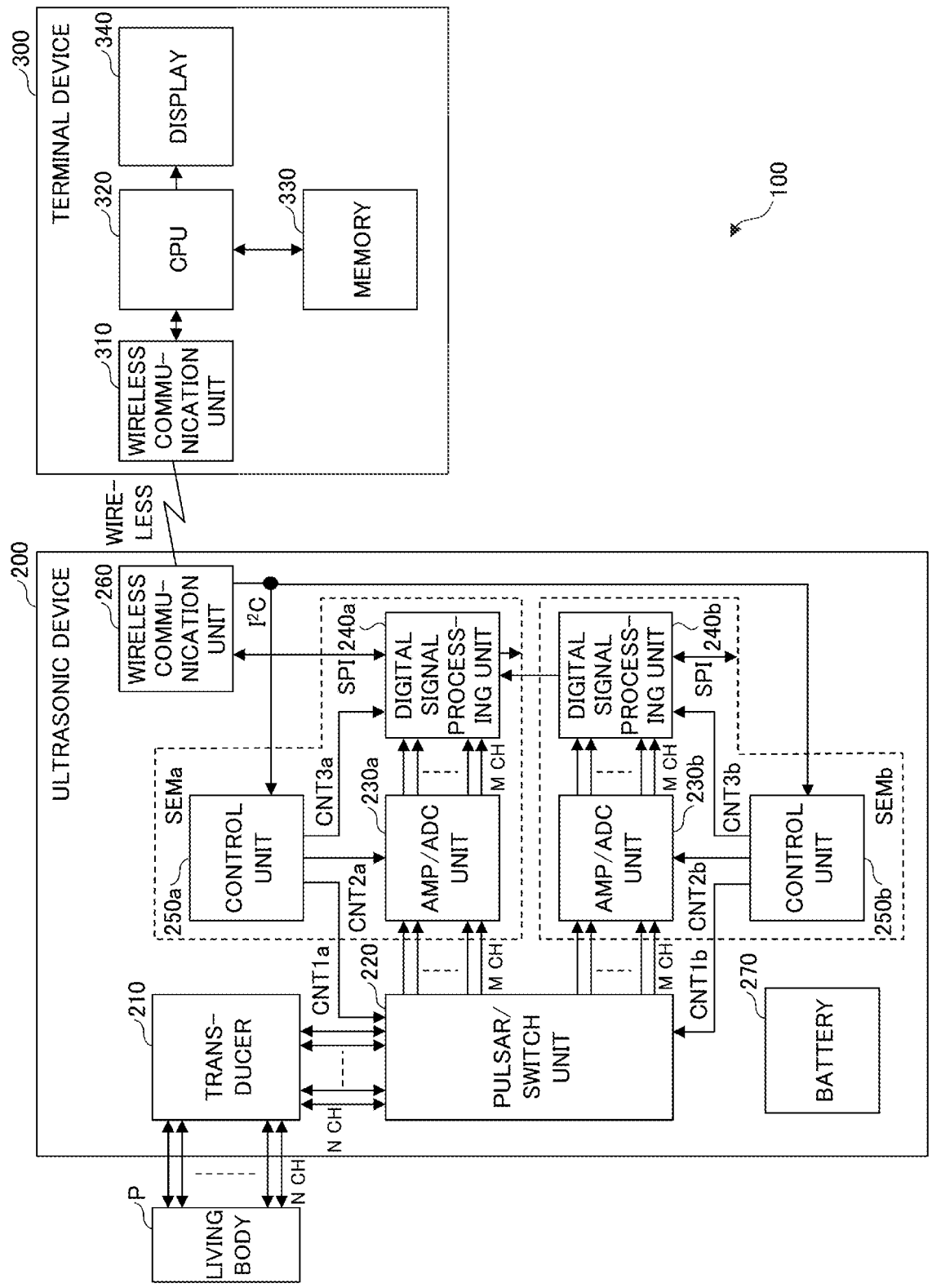
FIG. 1 is a block diagram illustrating an example of an ultrasonic diagnostic system that includes an ultrasonic device in a first embodiment.

FIG. 1 illustrates an example of an ultrasonic diagnostic system 100 including an ultrasonic device 200 in a first embodiment. The ultrasonic diagnostic system 100 includes an ultrasonic device 200 and a terminal device 300. The ultrasonic device 200 and the terminal device 300 execute wireless communication with each other. For example, the terminal device 300 is a portable general-purpose terminal such as a tablet terminal or a smartphone, or a general-purpose terminal such as a personal computer.

The ultrasonic device 200 is integrated with, for example, an ultrasonic probe and, and housed inside the housing of the ultrasonic probe. The ultrasonic device 200 includes a transducer 210, a pulsar/switch unit 220, AMP (Amplifier)/ADC (Analog to Digital Converter) units 230a and 230b, digital signal processing units 240a and 240b, control units 250a and 250b, a wireless communication unit 260, and a battery 270.

The AMP/ADC unit 230a, the digital signal processing unit 240a, and the control unit 250a are installed in a semiconductor device SEMa. The AMP/ADC unit 230b, the digital signal processing unit 240b, and the control unit 250b are installed in a semiconductor device SEMb. The transducer 210, the pulsar/switch unit 220, the semiconductor devices SEMa and SEMb, the wireless communication unit 260, and the battery 270 are installed on a printed circuit board housed in the ultrasonic device 200.

For example, the semiconductor devices SEMa and SEMb are products identical to each other, and the circuit configuration and functions of the semiconductor devices SEMa and SEMb are identical to each other. Therefore, there is no need to separately design and manufacture the semiconductor devices SEMa and SEMb to be installed in the ultrasonic device 200. Therefore, the design of the ultrasonic device 200 can be simplified, and the development time of the ultrasonic device 200 can be shortened, and the cost of the ultrasonic device 200 can be reduced. Note that the semiconductor devices SEMa and SEMb may be implemented by hardware such as a field-programmable gate array (FPGA) or an application specific integrated circuit (ASIC).

The terminal device 300 includes a wireless communication unit 310, a CPU (Central Processing Unit) 320, a memory 330, and a display 340.

The ultrasonic device 200 generates ultrasonic waves toward a living body P (subject), receives reflected waves (ultrasonic waves) reflected by the living body P, and generates ultrasonic image data based on the received reflected waves. The ultrasonic device 200 transmits the generated ultrasonic image data wirelessly to the terminal device 300. The terminal device 300 displays the ultrasonic image data received from the ultrasonic device 200 on the display 340 as an ultrasonic image.

The transducer 210 includes an oscillation element array in which multiple oscillation elements (not illustrated) are arranged in an array at positions opposite to a measurement region of an ultrasonic image in the living body P (subject). The transducer 210 outputs ultrasonic waves generated by a predetermined number of the oscillation elements in the oscillation element array toward the living body P, based on pulse signals generated by the pulsar/switch unit 220. In this embodiment, the oscillation element array includes N oscillation elements, and outputs M channels (M ch) of ultrasonic waves among N channels (N ch) to the living body.

Ultrasonic waves entering the living body P are reflected at a boundary at which the acoustic impedance becomes different. The transducer 210 receives ultrasonic waves (reflected waves) reflected from the living body P with N oscillation elements. The N oscillation elements convert the received ultrasonic waves into voltages, and output these to the pulsar/switch unit 220 as voltage signals of N channels. The transducer 210 and the pulsar/switch unit 220 are interconnected by signal lines of N channels.

The pulsar/switch unit 220 includes a pulsar and a switch, and operates based on control signals CNT1a and CNT1b output from the control units 250a and 250b of the semiconductor devices SEMa and SEMb, respectively. In the case where the transducer 210 transmits ultrasonic waves to the living body P, the pulsar/switch unit 220 transmits 2M pulse signals generated by the pulsar to the 2M oscillation elements of the transducer 210 via a switch at a predetermined timing. Although not limited in particular, for example, 'N' is 128 and 'M' is 32. 'N' may be 196 or 256, and 'M' may be 16 or 64.

In addition, in the case where the transducer 210 receives ultrasonic waves from the living body P, the pulsar/switch unit 220 selects, via the switch, voltage signals of 2M channels from among the voltage signals of N channels output from the transducer 210. The 2M channels selected by the pulsar/switch unit 220 are the same as the 2M channels from which the pulse signal was output. The 2M units and the 2M channels are examples of a first predetermined number; and the M units and the M channels are examples of a second predetermined number.

Then, the pulsar/switch unit 220 outputs voltage signals of M channels selected based on the control signal CNT1a from among voltage signals of the 2M channels, to the AMP/ADC unit 230a of the semiconductor device SEMa. In addition, the pulsar/switch unit 220 outputs voltage signals of the other M channels selected based on the control signal CNT1b from among voltage signals of the 2M channels, to the AMP/ADC unit 230b of the semiconductor device SEMb. The number of channels (in this example, 2M channels) of the voltage signals output from the pulsar/switch unit 220 to the semiconductor devices SEMa and SEMb is also referred to as the number of reception channels.

The voltage signals of M channels received by each of the AMP/ADC units 230a and 230b correspond to channels different from one another. Assume that the channel numbers of the 128 oscillation elements arranged in a row in the transducer 210 are '1' to '128' in order from one end. For example, the pulsar/switch unit 220 outputs the voltage signals from channel 1 to channel 32 to the AMP/ADC unit 230a, and outputs the voltage signals from channel 33 to channel 64 to the AMP/ADC unit 230b.

Alternatively, the pulsar/switch unit 220 outputs the voltage signals of the odd-numbered channels to the AMP/ADC unit 230a, and outputs the voltage signals of the even-numbered channels to the AMP/ADC unit 230b. Note that as will be described later, a group of channels (oscillation elements) selected by the pulsar/switch unit 220 is shifted by one every time image data is generated. For example, the pulsar/switch unit 220 selects voltage signals from channel 1 to channel 64, and then, selects voltage signals from channel 2 to channel 65.

The operations of AMP/ADC units 230a and 230b are equivalent to each other; therefore, in the following, the AMP/ADC unit 230a will be described. The AMP/ADC unit 230a operates based on a control signal CNT2a output from the control unit 250a. The AMP/ADC unit 230a includes M units of amplifiers (not illustrated, also referred to as AMP), and M units of analog-to-digital converters (also referred to as ADC). Each of the AMPs amplifies a voltage signal indicating a reflected wave of an ultrasonic wave in a corresponding one of the M channels received from the pulsar/switch unit 220, and outputs an amplified voltage signal to a corresponding one of the ADCs.

Each of the ADCs sequentially converts a voltage signal (analog signal) amplified by a corresponding one of the AMPs into digital data, to output digital data of M channels to the digital signal processing unit 240a. Here, the M ADCs generate respective digital data in time series, indicating change in time in the voltages generated by the M oscillation elements based on the reflected waves. In the following, the digital data in time series is also referred to as time-series data.

The digital signal processing unit 240b of the semiconductor device SEMb operates based on a control signal CNT3b output from the control unit 250b. The digital signal processing unit 240b extracts data of predetermined amounts of delays for each channel from time-series data of M channels received from the AMP/ADC unit 230b, to adjust the amounts of delays of the data. The digital signal processing unit 240b executes phase-addition of data having amounts of delays adjusted, and outputs the phase-addition data to the digital signal processing unit 240a of the semiconductor device SEMa.

The digital signal processing unit 240a of the semiconductor device SEMa operates based on a control signal CNT3a output from the control unit 250a. The digital signal processing unit 240a extracts data of predetermined amounts of delays for each channel from time-series data of M channels received from the AMP/ADC unit 230a, to adjust the amounts of delays of the data. The digital signal processing unit 240a executes phase-addition of the data having adjusted amounts of delays, and further adds the phase-addition data and the phase-addition data received from the semiconductor device SEMb.

Then, the digital signal processing unit 240a applies various types of processes to the data in which phase-addition has been applied to the 2M channels, to generate one line of image data representing an ultrasonic image, and output the generated image data to the wireless communication unit 260. Here, the one line of image data is data used for generating one line of an ultrasonic image directed from the surface of the living body P in the depth direction into the body at one of the multiple positions of a band-shaped measurement region on the surface of the living body P opposite to the oscillation element array. In the following, a position of the measurement region at which one line of ultrasonic image is generated is also referred to as a transmission position.

For example, the various processes executed by the digital signal processing unit 240a includes a gain correction process that takes attenuation of reflected waves in the living body P into account; an envelope process to retrieve brightness information; and the like. For example, the digital signal processing unit 240a and the wireless communication unit 260 are mutually connected via a SPI (Serial Peripheral Interface) bus.

The wireless communication unit 260 executes wireless communication with the wireless communication unit 310 of the terminal device 300 via, for example, a wireless network such as Wi-Fi (registered trademark, wireless LAN (Local Area Network)). Note that wireless communication between the wireless communication units 260 and 310 is not limited to Wi-Fi, and may be executed using a wireless network compliant with the other wireless standards. By providing the wireless communication unit 260 in the ultrasonic device 200, the ultrasonic device 200 can be separated from the terminal device 300 and integrated with the ultrasonic probe.

The wireless communication unit 260 outputs to the control units 250a and 250b, for example, a command to emit ultrasonic waves received from the terminal device 300, using an I²C (Inter-Integrated Circuit) interface bus. In addition, the wireless communication unit 260 transmits image data received from the digital signal processing unit 240a to the wireless communication unit 310 of the terminal device 300. The image data representing the ultrasonic image transmitted from the ultrasonic device 200 to the terminal device 300 is digital data.

The control unit 250a controls the AMP/ADC unit 230a, the digital signal processing unit 240a, and the pulsar/switch unit 220. The control unit 250b controls the AMP/ADC unit 230b, the digital signal processing unit 240b, and the pulsar/switch unit 220. For example, each of the control units 250a and 250b is implemented by a control program executed by a processor such as a CPU. In this case, each of the control units 250a and 250b may be included in a processor (not illustrated) installed in each of the semiconductor devices SEMa and SEMb.

For example, in response to a command to start measurement received from the terminal device 300 via the wireless communication unit 260, each of the control units 250a and 250b controls the pulsar/switch unit 220 to cause the transducer 210 to output ultrasonic waves.

In addition, in response to a command to stop measurement received from the terminal device 300 via the wireless communication unit 260, each of the control units 250a and 250b stops operations of the pulsar/switch unit 220, the AMP/ADC units 230a and 230b, and the like. Note that the command to start measurement and the command to stop measurement may be executed based on an operation performed with an operation button, an operation switch, or the like (not illustrated) provided on the ultrasonic device 200.

For example, the control units 250a and 250b include components in which logic can be programmed such as an FPGA. Accordingly, even in the case of using the same semiconductor devices SEM, respective control signals for causing the pulsar/switch unit 220, the AMP/ADC units 230a and 230b, and the digital signal processing units 240a and 240b to operate normally can be output from the control units 250a and 250b.

The battery 270 can be charged via, for example, charging terminals (not illustrated) provided on the ultrasonic device 200. The battery 270 supplies power to the pulsar/switch unit 220, the semiconductor devices SEMa and SEMb, and the wireless communication unit 260 in the ultrasonic device 200. Note that the battery 270 may be charged without contact. In addition, the ultrasonic device 200 may be operated using an external power supply such as a commercial power supply, and in this case, the ultrasonic device 200 may or may not have the battery 270.

The wireless communication unit 310 of the terminal device 300 receives ultrasonic image data and the like, from the wireless communication unit 260 of the ultrasonic device 200. In addition, the wireless communication unit 310 transmits a command to emit ultrasonic waves or the like to the wireless communication unit 260 of the ultrasonic device 200. The CPU 320 controls the overall operations of the terminal device 300 by, for example, executing a program.

The memory 330 holds image data received by the wireless communication unit 310, various programs executed by the CPU 320, data used in various programs, and the like. The memory 330 may be an SRAM (Static Random Access Memory), a DRAM (Dynamic Random Access Memory), or a flash memory. Note that the memory 330 may include at least one of an SRAM, a DRAM, and a flash memory; and a storage device.

The display 340 displays image data received from the ultrasonic device 200 as an ultrasonic image. Here, the ultrasonic image displayed on the display 340 includes a moving image obtained while scanning the living body P by the ultrasonic device 200, and a still image obtained when the scanning of the living body P by the ultrasonic device 200 is stopped. In the case where the terminal device 300 is a portable terminal such as a tablet terminal, the display 340 may include a touch panel. Note that a wired communication unit may be provided in each of the ultrasonic device 200 and the terminal device 300 separately from the wireless communication units 260 and 310, to transmit and receive image data and the like via wire. The respective wired communication units may be provided in place of the wireless communication units 260 and 310.

Figure 2:
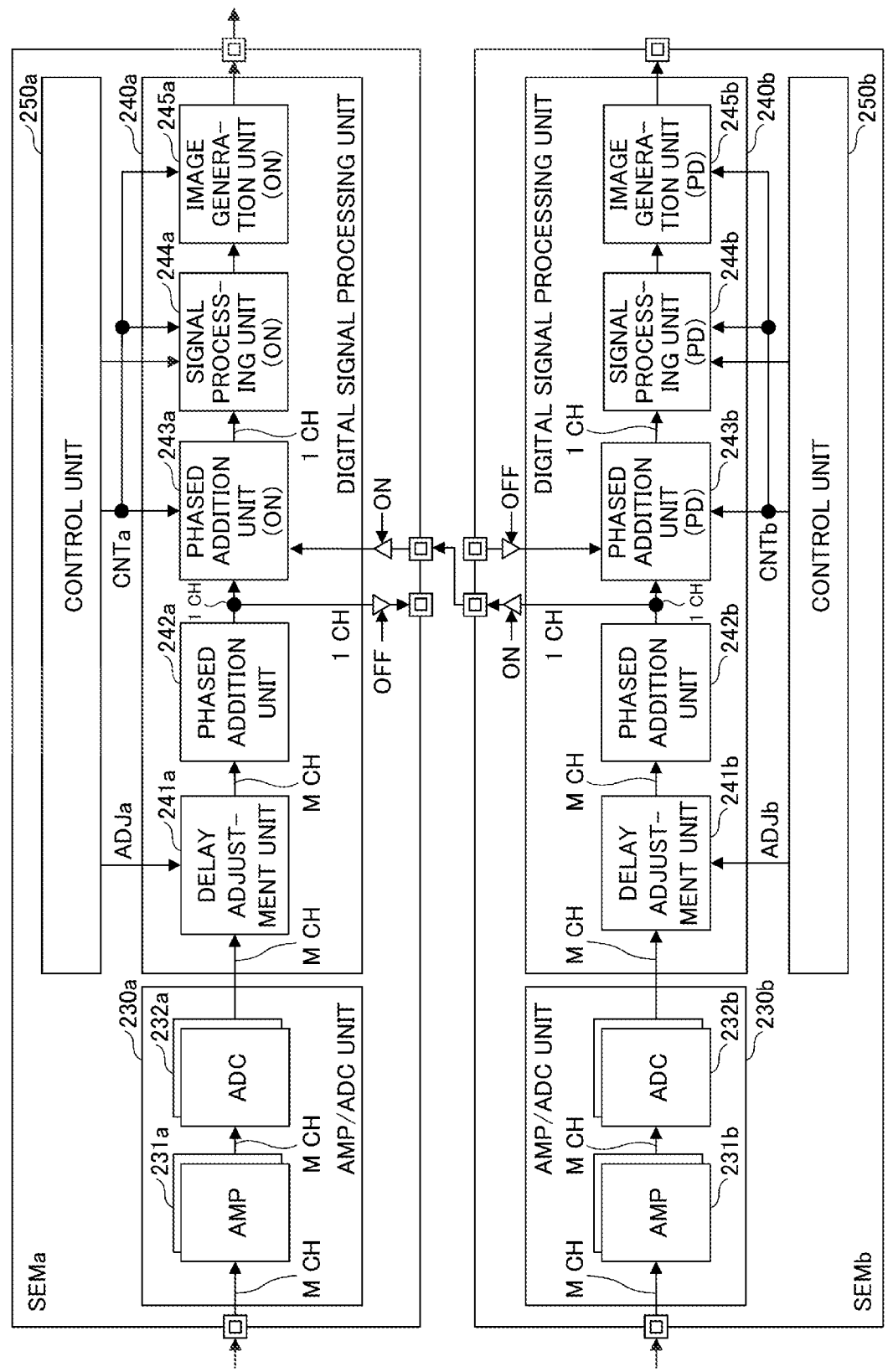
FIG. 2 is a block diagram illustrating examples of semiconductor devices in FIG. 1.

FIG. 2 illustrates examples of the semiconductor devices SEMa and SEMb in FIG. 1. In the following, a circuit configuration of the semiconductor device SEMa, and a circuit configuration in the semiconductor device SEMb that is different from the semiconductor device SEMa will be described. In FIG. 2, a double square mark indicates an external terminal of the semiconductor devices SEMa and SEMb, and a triangle mark indicates a buffer (e.g., tri-state buffer) that can be controlled to be on and off. Note that in FIG. 2 and FIG. 3, an example of operations of the ultrasonic device 200 (an example of a method of controlling the ultrasonic device 200) will be described.

In the semiconductor device SEMa, the AMP/ADC unit 230a includes M AMPs 231a operating simultaneously and M ADCs 232a operating simultaneously. The digital signal processing unit 240a includes a delay adjustment unit 241a, phased addition units 242a and 243a, a signal processing unit 244a, and an image generation unit 245a. The signal processing unit 244a has functions of applying various types of signal processing to data received from the phased addition unit 243a based on a control signal from the control unit 250a, and outputting the data having signal processing applied to the image generation unit 245a.

As described above, the multiple AMPs 231a respectively amplify the voltage signals representing reflected waves of ultrasonic waves of the M channels received from the pulsar/switch unit 220 via an external terminal, and output the amplified voltage signals to the corresponding ADCs 232a. The M ADCs 232a respectively convert the voltage signals of the M channels received from the corresponding AMPs 231a into time-series data, and output the time-series data obtained by the conversion to the delay adjustment unit 241a of the digital signal processing unit 240a.

The external terminal that receives a voltage signal from the pulsar/switch unit 220 is an example of a first terminal. The M ADCs 232 are an example of a data generator that generates a predetermined number of sets of time-series data, each of the sets indicating change in time in a plurality of voltages generated by a predetermined number of oscillation elements.

Based on a delay adjustment signal ADJa from the control unit 250a, the delay adjustment unit 241a extracts data of predetermined amounts of delays for each channel from time-series data of M channels received from the ADCs 232a, and outputs the extracted data of M channels to the phased addition unit 242a. In other words, by extracting the data of the predetermined amounts of delays from the time-series data of M channels, the delay adjustment unit 241a adjusts the amounts of delays of the data indicating reflected waves of ultrasonic waves of M channels.

The phased addition unit 242a sequentially adds the data of M channels whose amounts of delays are respectively adjusted by the delay adjustment unit 241a, and outputs the generated data (1 ch) to the phased addition unit 243a. The output of the phased addition unit 242a is connected to an external terminal via a buffer whose on/off is controlled by the control unit 250a. However, the buffer connected to the output of the phased addition unit 242a is set to an off state; therefore, the data added by the phased addition unit 242a is not output to the outside of the semiconductor device SEMa. The phased addition unit 242a is an example of a first adder.

The phased addition unit 243a, the signal processing unit 244a, and the image generation unit 245a operate in response to receiving a control signal CNTa indicating an enabled state from the control unit 250a (ON). The phased addition unit 243a receives data sequentially added by the phased addition unit 242b of the semiconductor device SEMb via an external terminal and a buffer whose on/off is controlled by the control unit 250a. The buffer connected to the phased addition unit 243a is set to an on state.

The phased addition unit 243a sequentially adds an addition result by the phased addition unit 242a and an addition result by the phased addition unit 242b of the semiconductor device SEMb, to generate one line of data (1 ch) in the depth direction of the living body P at a transmission position. The phased addition unit 243a outputs the generated one line of data to the signal processing unit 244a. The phased addition unit 243a is an example of a second adder. An external terminal connected to the phased addition unit 243a via a buffer is an example of a second terminal.

The signal processing unit 244a applies signal processing such as a gain correction process, an envelope process, or the like to data received from the phased addition unit 243a, and outputs the data having signal processing applied to the image generation unit 245a. Based on the data received from the signal processing unit 244a, the image generation unit 245a generates image data of one line in the depth direction of the living body P at the transmission position, and outputs the generated image data to the wireless communication unit 260 in FIG. 1 via an external terminal. Then, the one line of image data corresponding to the transmission position is transmitted to the terminal device 300, and displayed on the display 340 as an ultrasonic image. Note that the digital signal processing unit 240 may have the signal processing functions of the signal processing unit 244a included in the image generation unit 245a, and in this case, may not include the signal processing unit 244a.

In the semiconductor device SEMb, the AMP/ADC unit 230b includes M AMPs 231b operating simultaneously and M ADCs 232b operating simultaneously. The configuration and functions of the AMP/ADC unit 230b are substantially the same as the configuration and functions of the AMP/ADC unit 230a. The external terminal that receives a voltage signal from the pulsar/switch unit 220 is an example of a first terminal. The M ADCs 232 are an example of a data generator that generates a predetermined number of sets of time-series data, each of the sets indicating change in time in a plurality of voltages generated by a predetermined number of oscillation elements.

The digital signal processing unit 240b includes a delay adjustment unit 241b, phased addition units 242b and 243b, a signal processing unit 244b, and an image generation unit 245b. The configuration and functions of the digital signal processing unit 240b are substantially the same as the configuration and functions of the digital signal processing unit 240a. For example, the signal processing unit 244b includes functions of applying various signal processing to data received from the phased addition unit 243b based on the control signal from the control unit 250b, and outputting the data after the signal processing to the image generation unit 245b.

However, a delay adjustment signal ADJb received by the delay adjustment unit 241b is different from the delay adjustment signal ADJa received by the delay adjustment unit 241a of the semiconductor device SEMa. Therefore, data of predetermined amounts of delays extracted by the delay adjustment unit 241a and 241b are different from each other for each channel.

In addition, in response to receiving a control signal CNTb indicating a disabled state from the control unit 250b, the phased addition unit 243b, the signal processing unit 244b, and the image generation unit 245b are set to a power-down state, and stop operations (PD). Accordingly, even in the case where multiple semiconductor devices SEMa and SEMb identical to each other are installed in the ultrasonic device 200, wasteful power consumption that does not contribute to generation of image data of an ultrasonic image can be suppressed. Note that the digital signal processing unit 240b may have the signal processing functions of the signal processing unit 244b included in the image generation unit 245b, and in this case, may not include the signal processing unit 244b.

The output of the phased addition unit 242b is connected to an external terminal via a buffer whose on/off is controlled by the control unit 250b. The buffer connected to the output of the phased addition unit 242b is set to an on state. An input of the phased addition unit 243b is connected to an external terminal via a buffer whose on/off is controlled by the control unit 250b. The phased addition unit 242b is an example of a first adder; and the phased addition unit 243b is an example of a second adder. The external terminal connected to the phased addition unit 243b via the buffer is an example of a second terminal.

The buffer connected to the output of the phased addition unit 242b is set to an on state; therefore, the data added by the phased addition unit 242b is transmitted to the phased addition unit 243a of the semiconductor device SEMa via the external terminal. Accordingly, compared to the case of using only the semiconductor device SEMa, the number of reception channels, which is the number of channels used for generating image data, can be doubled, and the resolution of an ultrasonic image displayed on the display 340 can be increased.

In this way, in this embodiment, the semiconductor device SEMa operates as a main semiconductor device that generates image data for generating an ultrasonic image. The semiconductor device SEMb operates as a sub-semiconductor device that generates data necessary for the semiconductor device SEMa to generate image data.

Note that the respective amounts of delays of the data of the M channels by the delay adjustment units 241a and 241b are determined by a relationship between the positions of the M oscillation elements that generate ultrasonic waves toward the living body P in the oscillation element array, and the positions at which one line of image data in the measurement region of the living body P is generated. Further, the respective amounts of delays of the data of the M channels by the delay adjustment units 241a and 241b are determined according to the position where the image data is generated on a line facing into the body from the surface of the measurement site (transmission position) of the living body P.

Note that the control unit 250a may output the control signal CNTa to the phased addition unit 243a to transfer the addition result of the phased addition unit 242a to the signal processing unit 244a. In this case, the control unit 250a outputs the delay adjustment signal ADJa to cause the delay adjustment unit 241a to adjust the amounts of delays for generating image data using only the addition result (of M channels) of the phased addition unit 242a. Then, the control unit 250b may generate a control signal to stop operations of the AMP/ADC unit 230b and the digital signal processing unit 240b.

Accordingly, the number of reception channels used for generating ultrasonic image data may be switched to 2M channels or M channels. For example, in the case where the battery 270 has a sufficient remaining capacity, the ultrasonic device 200 causes the semiconductor devices SEMa and SEMb to operate, and generates image data using the 2M channels. In the case where the remaining capacity of the battery 270 is low, the ultrasonic device 200 causes only the semiconductor device SEMa to operate, and generates image data using the M channels. Accordingly, the operable time of the battery 270 can be lengthened. The number of reception channels used for generating image data may be switched by an operator who operates the ultrasonic device 200.

Figure 3:
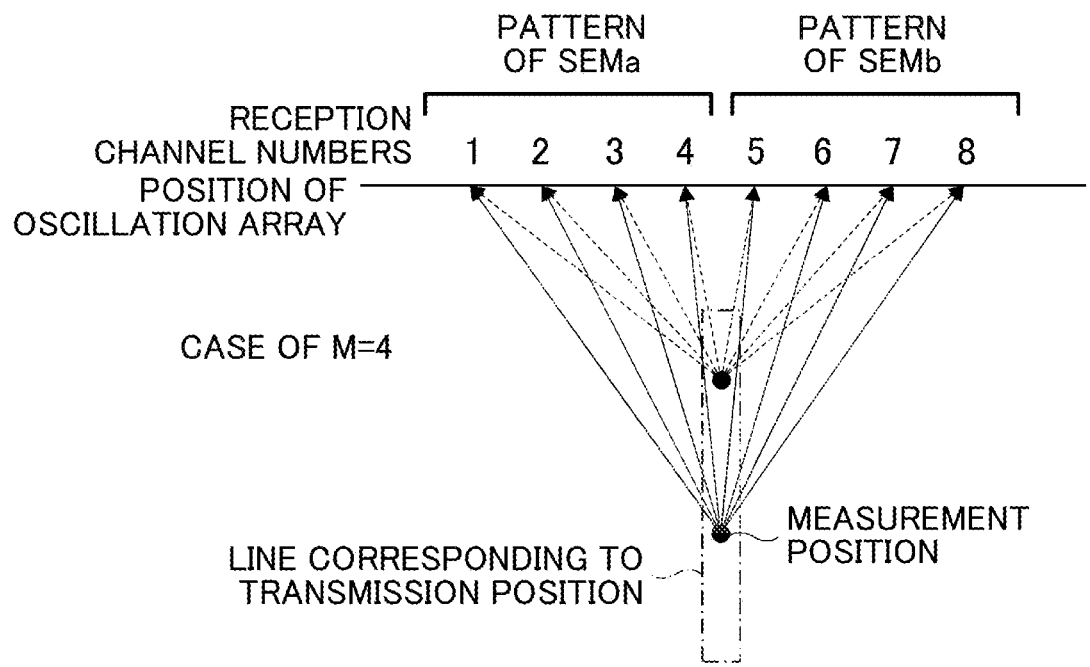
FIG. 3 is an explanatory diagram illustrating an example of delay adjustment executed by a delay adjustment unit of each semiconductor device in FIG. 2.
Figure 3:
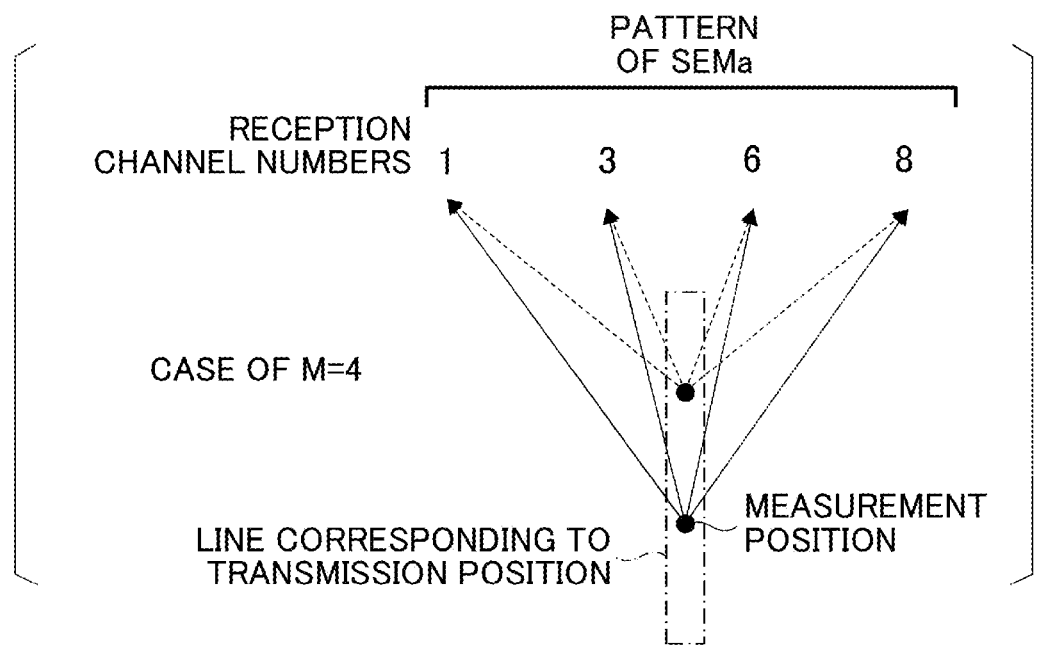

FIG. 3 illustrates an example of delay adjustment by the respective delay adjustment units 241a and 241b of the semiconductor devices SEMa and SEMb in FIG. 2. In FIG. 3, in order to make the description easier to understand, M=4 is assumed. In brackets on the lower side of FIG. 3, an example of delay adjustment when only using the semiconductor device SEMa is illustrated.

A dash-dotted frame indicates one line that is directed from the surface of the living body P corresponding to the transmission position toward the inside of the body. Eight of the multiple oscillation elements in the oscillation element array are indicated by reception channel numbers from 1 to 8. Times taken for ultrasonic waves reflected from the measurement position in the body of the living body P to reach the respective oscillation elements are indicated by the lengths of arrows.

Each of the delay adjustment units 241a and 241b in FIG. 2 adjusts the amounts of delays so that ultrasonic waves from the measurement position reach the corresponding oscillation elements of the multiple channels at the same time. In other words, each of the delay adjustment units 241a and 241b adjusts the amounts of delays so that the arrows have the same length. For example, the delay adjustment unit 241a reduces the amount of delay of channel 1 to be less than the amount of delay of channel 2. Specifically, in the time-series data for each channel generated by the ADC 232a, the delay adjustment unit 241a extracts data of channel 1 from the position where the reception time is earlier than data of channel 2.

In addition, the time difference between the ultrasonic waves reaching the multiple oscillation elements depends on the measurement position, and becomes greater as the measurement position is closer to the surface of the living body P. Therefore, each of the delay adjustment units 241a and 241b changes the amount of delay for each channel according to the distance from the surface of the living body P at the measurement position.

Each of the control units 250a and 250b may include a logic circuit that determines logic values of the delay adjustment signals ADJa and ADJb to adjust the amounts of delays of each of the delay adjustment units 241a and 241b according to the measurement position. In addition, each of the control units 250a and 250b may include a ROM that outputs logic values of the delay adjustment signals ADJa and ADJb to adjust the amounts of delays of each of the delay adjustment units 241a and 241b according to the measurement position. Here, the logical values of the delay adjustment signals ADJa and ADJb are address values or the like indicating the read position of data to be extracted among time-series data stored in the memory or register.

Note that by having a greater number of oscillation elements to detect ultrasonic waves, i.e., by having a greater number of arrows, a greater amount of information on data for generating image data is obtained, and hence, the resolution of the ultrasonic image can be made higher. Therefore, as illustrated in the brackets on the lower side of FIG. 3, in the case where only the semiconductor device SEMa is used for receiving ultrasonic waves with four oscillation elements, the resolution of the ultrasonic image is lower as compared to receiving ultrasonic waves with eight oscillation elements.

For example, in the brackets on the lower side of FIG. 3, an example of delay adjustment is illustrated in the case where only the semiconductor device SEMa in FIG. 2 is operated to generate image data. Based on the control signal CNT1a from the control unit 250a, the pulsar/switch unit 220 in FIG. 1 selects voltage signals from the oscillation elements indicated by the reception channel numbers 1, 3, 6, and 8, and outputs the selected voltage signals to the AMP/ADC unit 230a. Accordingly, although the resolution of the ultrasonic image is reduced, the power consumption of the ultrasonic device 200 can be reduced by almost half.

As above, in this embodiment, the same semiconductor device can be used for multiple semiconductor devices SEMa and SEMb installed in the ultrasonic device 200, and hence, the design of the ultrasonic device 200 can be simplified. As a result, the development time of the ultrasonic device 200 can be shortened, and the cost of the ultrasonic device 200 can be reduced. In other words, according to the required resolution of an ultrasonic image, the number of reception channels can be easily increased and decreased, by changing the number of the semiconductor devices SEM installed in the ultrasonic device 200. Therefore, change in design of the ultrasonic device 200 can be easily handled.

In the case where the same semiconductor device SEM is installed in the ultrasonic device 200, operations of the phased addition unit 243b, the signal processing unit 244b, and the image generation unit 245b, which do not contribute to generation of image data of the ultrasonic image, are stopped. Accordingly, wasteful power consumption of the ultrasonic device 200 can be suppressed. In other words, by operating one of the same semiconductor devices SEM as a main semiconductor device and the other as a sub-semiconductor device, the wasteful power consumption of the ultrasonic device 200 can be suppressed.

The control units 250a and 250b include components in which logic can be programmed such as an FPGA. Accordingly, even in the case of using the same semiconductor devices SEM, respective control signals for causing the pulsar/switch unit 220, the AMP/ADC units 230a and 230b, and the digital signal processing units 240a and 240b to operate normally can be output from the control units 250a and 250b. By providing the wireless communication unit 260 in the ultrasonic device 200, the ultrasonic device 200 can be separated from the terminal device 300 and integrated with the ultrasonic probe.

Second Embodiment

Figure 4:
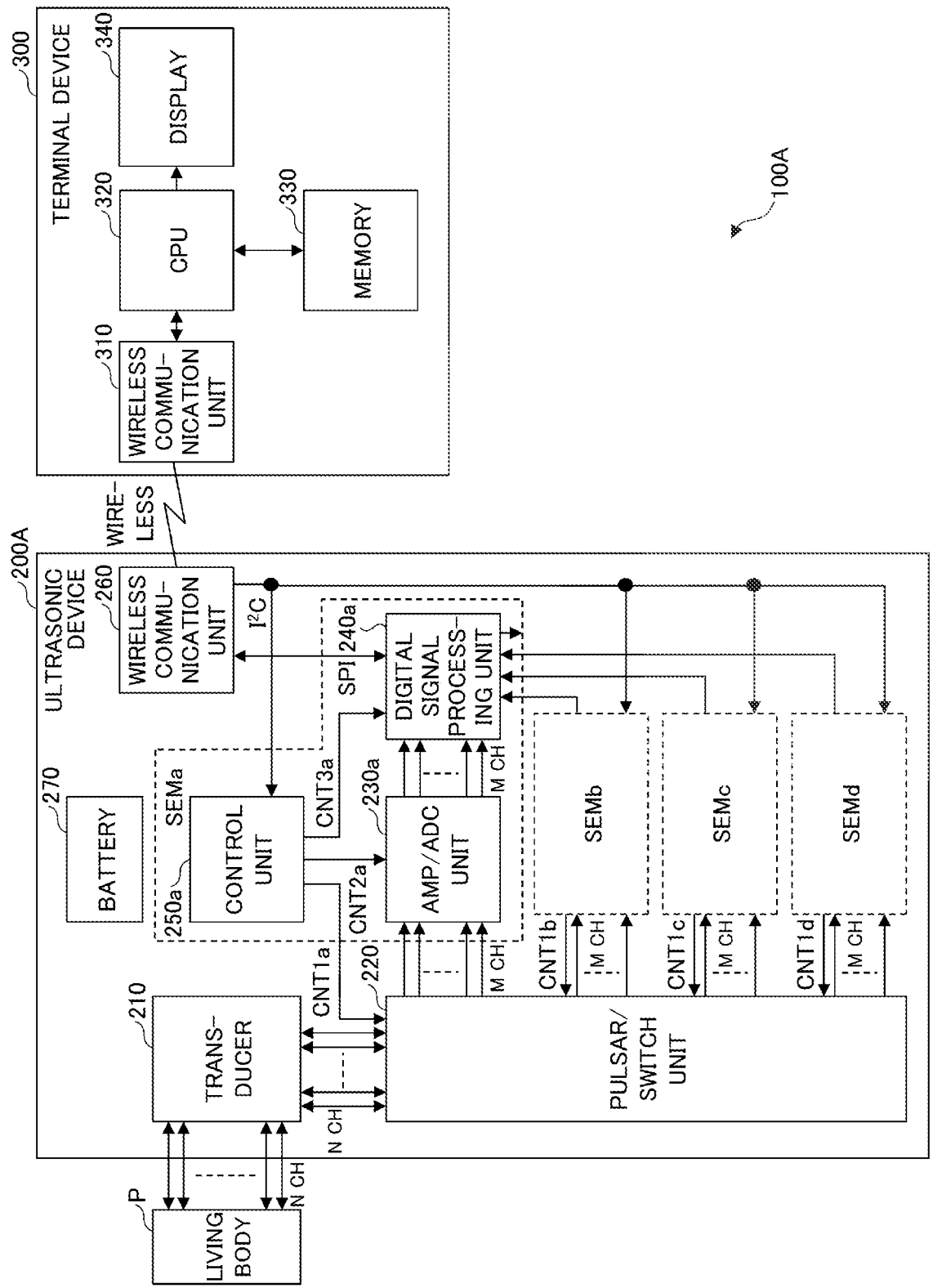
FIG. 4 is a block diagram illustrating an example of an ultrasonic diagnostic system that includes an ultrasonic device in a second embodiment.

FIG. 4 illustrates an example of an ultrasonic diagnostic system that includes an ultrasonic device in a second embodiment. Elements that are substantially the same as those in FIG. 1 are assigned the same reference numerals, and detailed description is omitted. In this embodiment, an ultrasonic diagnostic system 100A includes an ultrasonic device 200A and a terminal device 300.

The ultrasonic device 200A includes four semiconductor devices SEMa, SEMb, SEMc, and SEMd. The semiconductor devices SEMa, SEMb, SEMc, and SEMd are identical to each other; therefore, an internal configuration of only the semiconductor device SEMa is illustrated in FIG. 4. Note that the semiconductor device SEMa is substantially the same as the semiconductor device SEMa in FIG. 1, except that the digital signal processing unit 240a is different from the digital signal processing unit 240a in FIG. 1.

The other semiconductor devices SEMb, SEMc, and SEMd are also substantially the same as the semiconductor device SEMb in FIG. 1, except that the digital signal processing unit is different from the digital signal processing unit 240b in FIG. 1. In the following, in the case of describing the semiconductor devices SEMa, SEMb, SEMc, and SEMd without distinction, these may also be simply referred to as the semiconductor device(s) SEM. Note that the number of the semiconductor devices SEM installed in the ultrasonic device 200A is not limited to four as long as being greater than or equal to two.

The semiconductor device SEMa operates as a main semiconductor device that generates image data for generating an ultrasonic image. The semiconductor devices SEMb, SEMc, and SEMd operates as sub-semiconductor devices that generate data necessary for the semiconductor device SEMa to generate image data. Each of the semiconductor devices SEM operates as a main semiconductor device or a sub-semiconductor device, based on a command received from the terminal device 300 via the wireless communication unit 260.

Each of the semiconductor devices SEM operates by receiving voltage signals of M channels from the pulsar/switch unit 220 as in FIG. 1. Therefore, the pulsar/switch unit 220 selects, via a switch, voltage signals of 4M channels among voltage signals of N channels output from the transducer 210.

Then, the pulsar/switch unit 220 outputs the voltage signals of the 4M channels to each of the semiconductor devices SEMa, SEMb, SEMc, and SEMd. The M channels selected by the pulsar/switch unit 220 are respectively indicated by control signals CNT1a, CNT1b, CNT1c, and CNT1d output from the respective semiconductor devices SEMa, SEMb, SEMc, and SEMd. The pulsar/switch unit 220 is substantially the same as the pulsar/switch unit 220 in FIG. 1, except that the number of channels to be selected and the output destination of the voltage signals are different.

Note that in the case where the remaining capacity of the battery 270 is low, by sequentially reducing the number of semiconductor devices SEMb, SEMc, and SEMd operating as the sub-semiconductor devices to reduce the number of reception channels, the operable time of the battery 270 can be lengthened.

Figure 5:
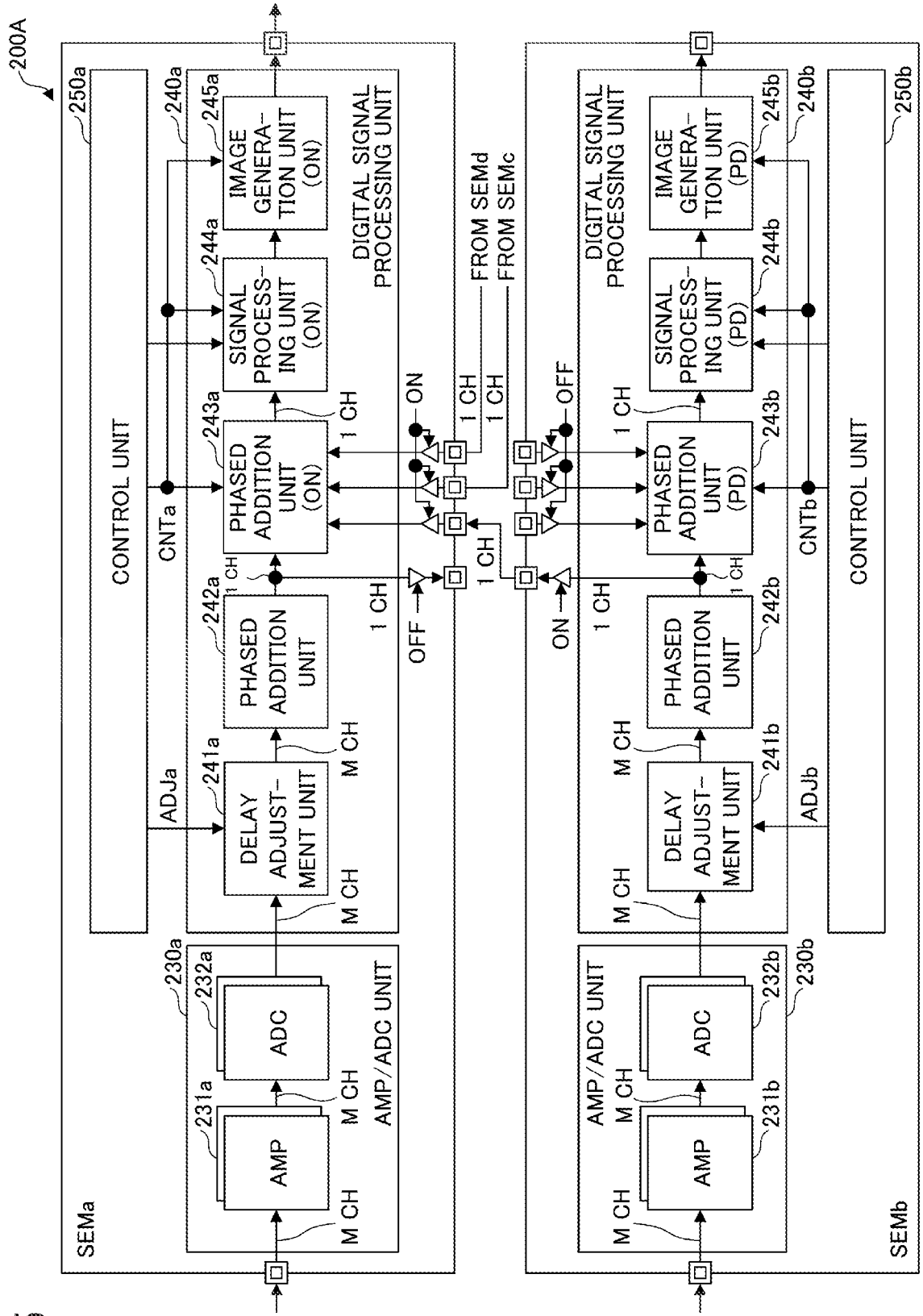
FIG. 5 is a block diagram illustrating examples of semiconductor devices in FIG. 4.
Figure 6:
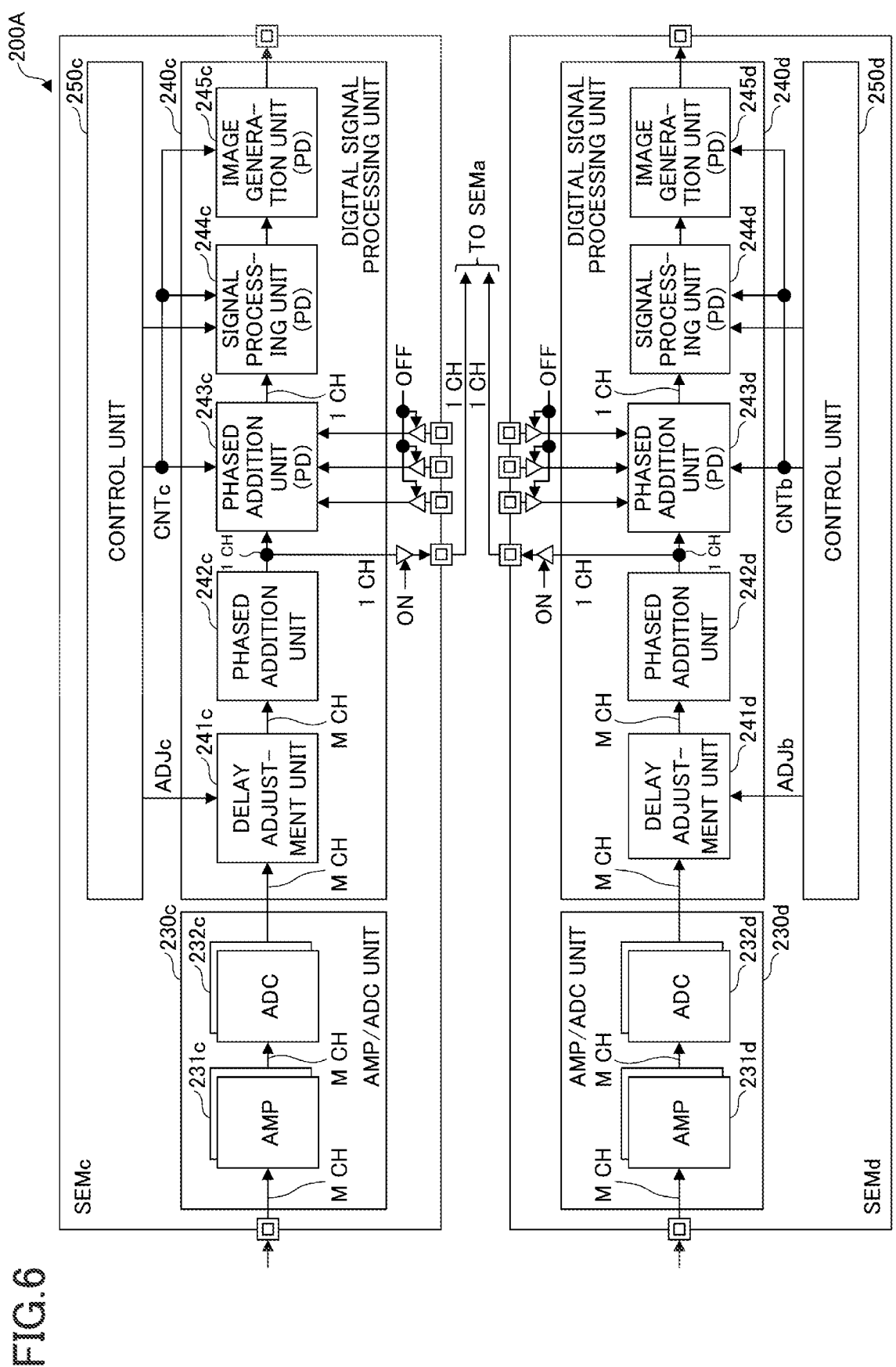
FIG. 6 is a block diagram illustrating examples of semiconductor devices in FIG. 4.

FIG. 5 illustrates an example of the semiconductor devices SEMa and SEMb in FIG. 4. FIG. 6 illustrates an example of the semiconductor devices SEMc and SEMd in FIG. 4. Elements that are substantially the same as those in FIG. 2 are assigned the same reference numerals, and detailed description is omitted. The semiconductor device SEMa is substantially the same as the semiconductor device SEMa in FIG. 2, except that the phased addition unit 243a receives data added by the respective phased addition units 242b, 242c, and 242d of the semiconductor devices SEMb, SEMc, and SEMd. Note that in FIGS. 5, 6 and 7, an example of operations of the ultrasonic device 200A (an example of a method of controlling the ultrasonic device 200A) will be described.

In the semiconductor device SEMa, a buffer connected to the output of the phased addition unit 242*a* is set to an off state, and three buffers connected to the input of the phased addition unit 243*a* are set to an on state. External terminals connected to the three buffers are examples of a second terminal. The phased addition unit 243*a*, the signal processing unit 244*a*, and the image generation unit 245*a* operate in response to receiving a control signal CNTa indicating an enabled state from the control unit 250*a* (ON).

In the semiconductor device SEMb, a buffer connected to the output of the phased addition unit 242*b* is set to an on state, and one channel of data output from the phased addition unit 242*b* is output to the semiconductor device SEMa. Three buffers connected to the input of the phased addition unit 243*b* are set to an off state. External terminals connected to the three buffers are examples of a second terminal. In response to receiving a control signal CNTb indicating a disabled state from the control unit 250*b*, the phased addition unit 243*b*, the signal processing unit 244*b*, and the image generation unit 245*b* are set to a power-down state, and stop operations (PD).

In the semiconductor device SEMc in FIG. 6, a buffer connected to the output of the phased addition unit 242*c* is set to an on state, and outputs one channel of data output from the phased addition unit 242*c* to the semiconductor device SEMa. Three buffers connected to the input of the phased addition unit 243*c* are set to an off state. External terminals connected to the three buffers are examples of a second terminal. In response to receiving a control signal CNTc indicating a disabled state from the control unit 250*c*, the phased addition unit 243*c*, the signal processing unit 244*c*, and the image generation unit 245*c* are set to a power-down state, and stop operations (PD).

In the semiconductor device SEMd, a buffer connected to the output of the phased addition unit 242*d* is set to an on state, and one channel of data output from the phased addition unit 242*d* is output to the semiconductor device SEMa. Three buffers connected to the input of the phased addition unit 243*d* are set to an off state. External terminals connected to the three buffers are examples of a second terminal. In response to receiving a control signal CNTd indicating a disabled state from the control unit 250*d*, the phased addition unit 243*d*, the signal processing unit 244*d*, and the image generation unit 245*d* are set to a power-down state, and stop operations (PD).

In this embodiment, the phased addition unit 243*a* of the semiconductor device SEMa operating as the main semiconductor device receives data respectively added by the phased addition unit 242*a*, 242*b*, 242*c*, and 242*d*, and executes an addition process. Therefore, compared to the case of using only the semiconductor device SEMa, the number of reception channels, which is the number of channels used for generating image data, can be quadrupled, and the resolution of an ultrasonic image displayed on the display 340 can be further increased as compared to FIG. 2. In addition, in the semiconductor devices SEMb, SEMc, and SEMd operating as the sub-semiconductor devices, wasteful power consumption can be suppressed by stopping operations of circuits that do not contribute to generation of ultrasonic image data.

Figure 7:
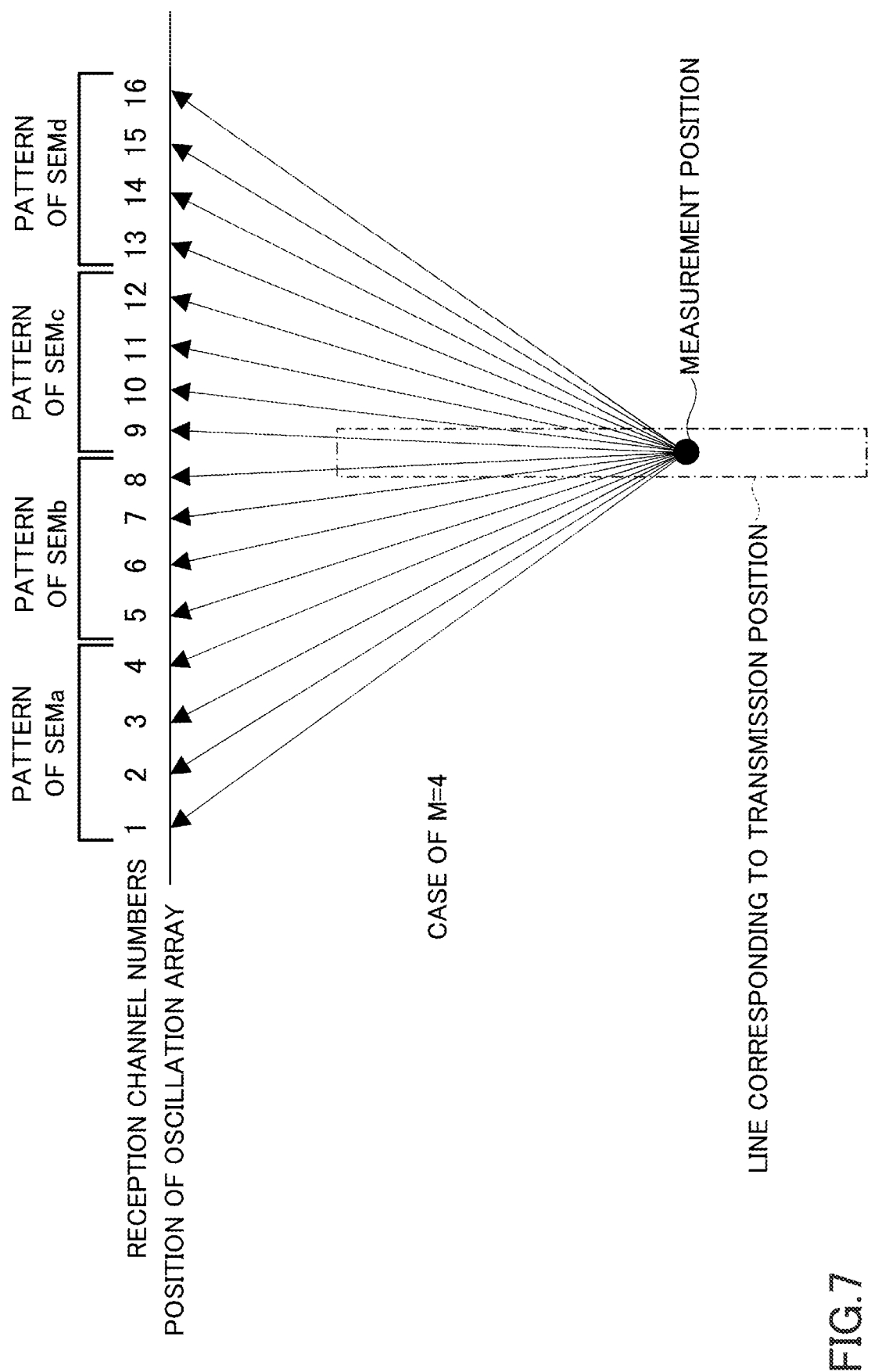
FIG. 7 is an explanatory diagram illustrating an example of delay adjustment executed by respective delay adjustment units of the semiconductor devices in FIGS. 5 and 6.

FIG. 7 illustrates an example of delay adjustment by the respective delay adjustment units 241*a*, 241*b*, 241*c*, and 241*d* of the semiconductor devices SEM in FIGS. 5 and 6. For contents that are substantially the same as in FIG. 3, detailed description is omitted. Also in FIG. 7, in order to make the description easier to understand, M=4 is assumed.

Each of the delay adjustment units 241*a*, 241*b*, 241*c*, and 241*d* adjusts the amounts of delays so that ultrasonic waves from the measurement position reach the corresponding oscillation elements of the multiple channels at the same time. In addition, each of the delay adjustment units 241*a*, 241*b*, 241*c*, and 241*d* changes the amounts of delays for each channel according to the distance from the surface of the living body P at the measurement position. Note that a relationship among the semiconductor devices SEM and the reception channel numbers may be other than the combination illustrated in FIG. 7, as long as the semiconductor devices SEM can receive time-series data of four channels.

As above, also in this embodiment, substantially the same effects as in the embodiment described above can be obtained. Further, in this embodiment, the number of reception channels can be easily increased, by increasing the number of the semiconductor devices SEM installed in the ultrasonic device 200A. In addition, in the case where the remaining capacity of the battery 270 is low, by reducing the number of operating semiconductor devices SEM and reducing the number of reception channels, the operable time of the battery 270 can be lengthened.

Third Embodiment

Figure 8:
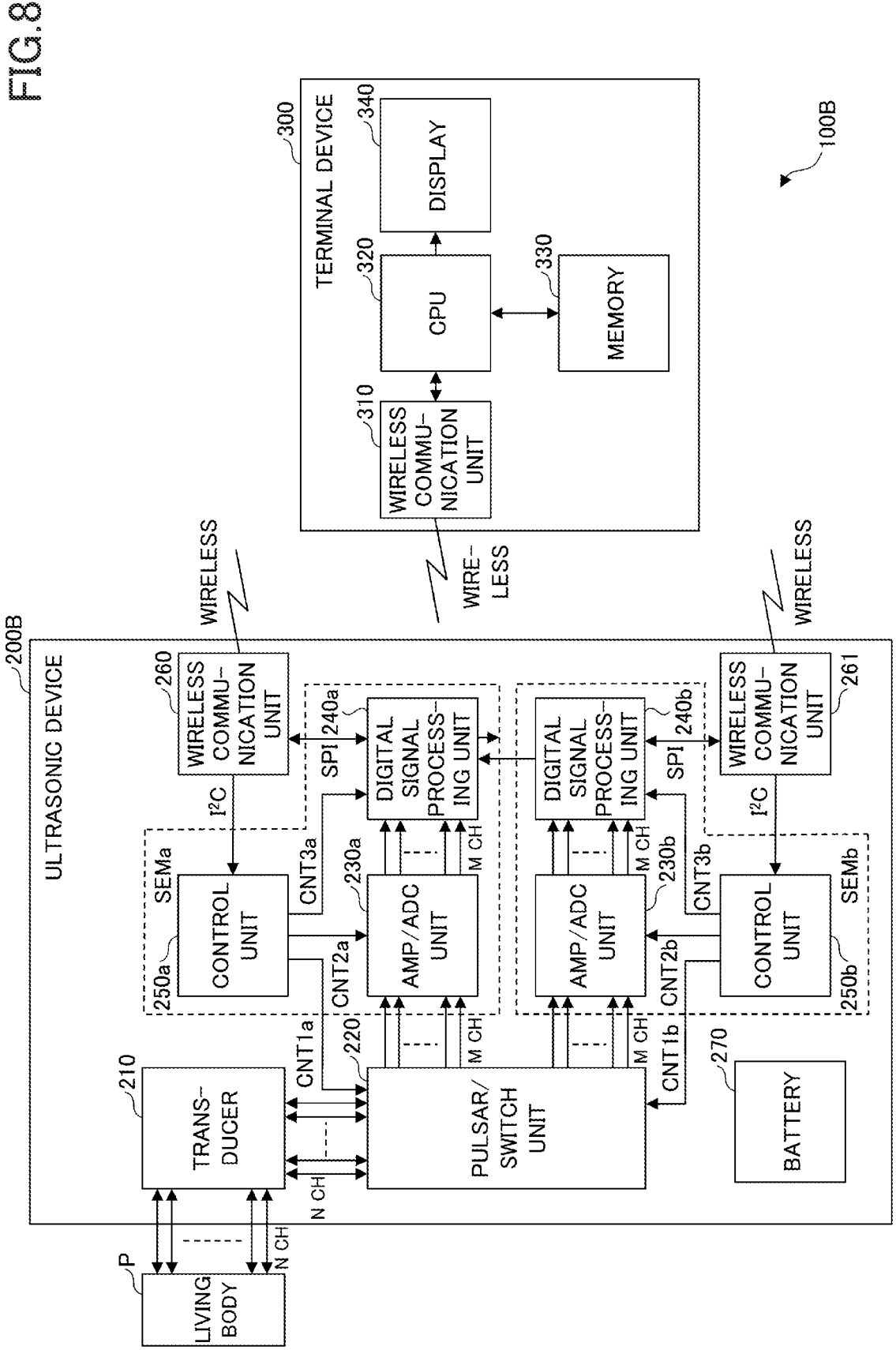
FIG. 8 is a block diagram illustrating an example of an ultrasonic diagnostic system that includes an ultrasonic device in a third embodiment.

FIG. 8 illustrates an example of an ultrasonic diagnostic system that includes an ultrasonic device in a third embodiment. Elements that are substantially the same as those in FIG. 1 are assigned the same reference numerals, and detailed description is omitted. In this embodiment, the ultrasonic diagnostic system 100B includes an ultrasonic device 200B and a terminal device 300.

The ultrasonic device 200B includes semiconductor devices SEMa and SEMb. The semiconductor devices SEMa and SEMb are identical to each other, and both operate as the master semiconductor devices. Therefore, the digital signal processing unit 240*a* of the semiconductor device SEMa and the digital signal processing unit 240*b* of the semiconductor device SEMb transmit and receive data with each other. Note that the number of the semiconductor devices SEM installed in the ultrasonic device 200B is not limited to four as long as being greater than or equal to two.

In addition, the ultrasonic device 200B includes a wireless communication unit 260 connected to the semiconductor device SEMa, and a wireless communication unit 261 connected to the semiconductor device SEMb. The wireless communication units 260 and 261 operate independently from each other, and execute communication with the wireless communication unit 310 of the terminal device 300.

Figure 9:
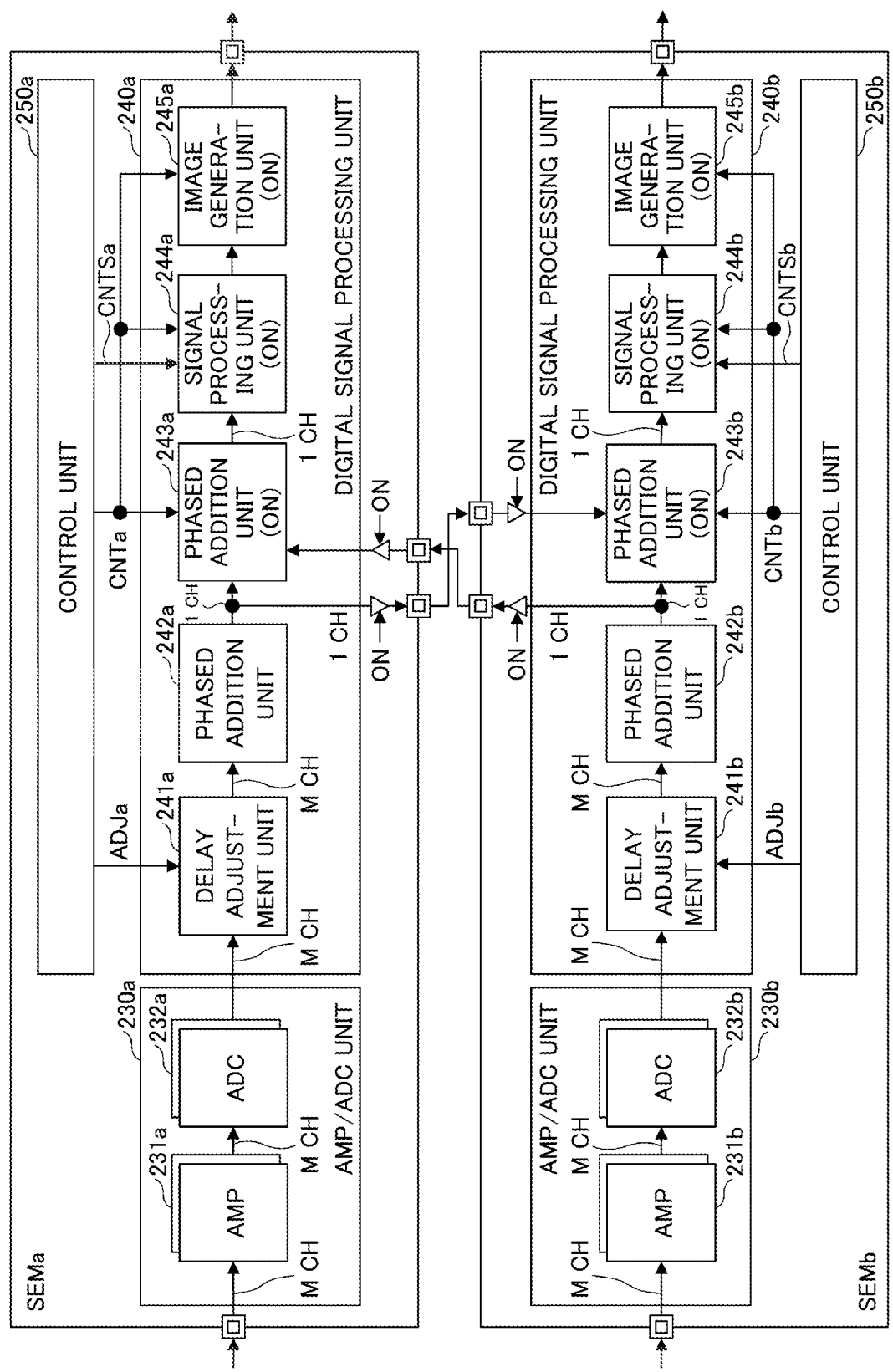
FIG. 9 is a block diagram illustrating examples of semiconductor devices in FIG. 8.

FIG. 9 illustrates an example of the semiconductor devices SEMa and SEMb in FIG. 8. Elements that are substantially the same as those in FIG. 2 are assigned the same reference numerals, and detailed description is omitted. Operations down to the phased addition units 242*a* and 242*b* are substantially the same as the operations of the semiconductor devices SEMa and SEMb in FIG. 2. Note that in FIG. 9, an example of operations of the ultrasonic device 200B (an example of a method of controlling the ultrasonic device 200B) will be described.

However, in this embodiment, a buffer connected to the output of the phased addition unit 242*a* and a buffer connected to the input of the phased addition unit 243*b* are both turned on. Therefore, data obtained by addition by the phased addition unit 242*a* is transmitted to the phased addition unit 243*b*. In addition, the phased addition unit 243*b*, the signal processing unit 244*b*, and the image generation unit 245b operate in response to receiving a control signal CNTb indicating an enabled state from the control unit 250b (ON).

Accordingly, each of the digital signal processing units 240a and 240b generates image data corresponding to 2M reception channels. Image data generated by the digital signal processing unit 240a is transmitted to the terminal device 300 via the wireless communication unit 260. Image data generated by the digital signal processing unit 240b is transmitted to the terminal device 300 via the wireless communication unit 261. Therefore, two ultrasonic images based on two image data can be displayed on the display 340.

Note that the ultrasonic device 200B may cause the signal processing units 244a and 244b to execute signal processing different from each other. For example, based on control signals CNTSa and CNTSb output from the control units 250a and 250b, respectively, the signal processing units 244a and 244b execute filtering in bands different from each other, or execute gain adjustment different from each other. Accordingly, two ultrasonic images to be displayed on the display 340 of the terminal device 300 can be different from each other. In addition, an operator of the terminal device 300 viewing the display 340 can select one of the two ultrasonic images to be enlarged for display.

In addition, the ultrasonic devices 200B may have the wireless schemes of the wireless communication units 260 and 261 different from each other. For example, the wireless communication unit 260 transmits image data to the terminal device 300 by using the 2.4 GHz band of Wi-Fi, and the wireless communication unit 261 transmits image data to the terminal device 300 by using the 5 GHz band of Wi-Fi. For example, the terminal device 300 prioritizes image data having a higher reception intensity over the other when displaying the data on the display 340. Accordingly, interruption of wireless communication between the ultrasonic device 200B and the terminal device 300 can be reduced, and degradation in quality of the ultrasonic image displayed on the display 340 can be suppressed.

Further, in the case where the remaining capacity of the battery 270 is low, by reducing the number of operating semiconductor devices SEM and reducing the number of reception channels, the operable time of the battery 270 can be lengthened. In this case, image data is transmitted to the terminal device 300 by using one of the wireless communication units 260 and 261. In addition, in the case where the remaining capacity of the battery 270 is low, the ultrasonic device 200B may stop operations of the wireless communication unit 261 and transmit image data to the terminal device 300 by using only the wireless communication unit 260, similar to the ultrasonic device 200 in FIG. 1.

Further, in the case where either of the two ultrasonic images is enlarged for display, the ultrasonic device 200B may set the phased addition unit 243, the signal processing unit 244, and the image generation unit 245, which generate image data corresponding to an ultrasonic image not to be displayed, to a power-down state. Here, the phased addition unit 243 is one of the phased addition units 243a and 243b; the signal processing unit 244 is one of the signal processing units 244a and 244b; and the image generation unit 245 is one of the image generation units 245a and 245b.

As above, also in this embodiment, substantially the same effects as in the embodiments described above can be obtained. Further, in this embodiment, multiple items of image data are transmitted from the multiple semiconductor devices SEM of the ultrasonic device 200A to the terminal device 300. Accordingly, from among the multiple ultrasonic images generated from image data, a high-quality ultrasonic image can be selectively displayed on the display 340. Alternatively, an ultrasonic image that is easy to diagnose can be selectively displayed on the display 340. At this time, by mutually transmitting phase-added data among the multiple semiconductor devices SEM, a high resolution ultrasonic image with an increased number of reception channels can be displayed on the display 340.

Fourth Embodiment

Figure 10:
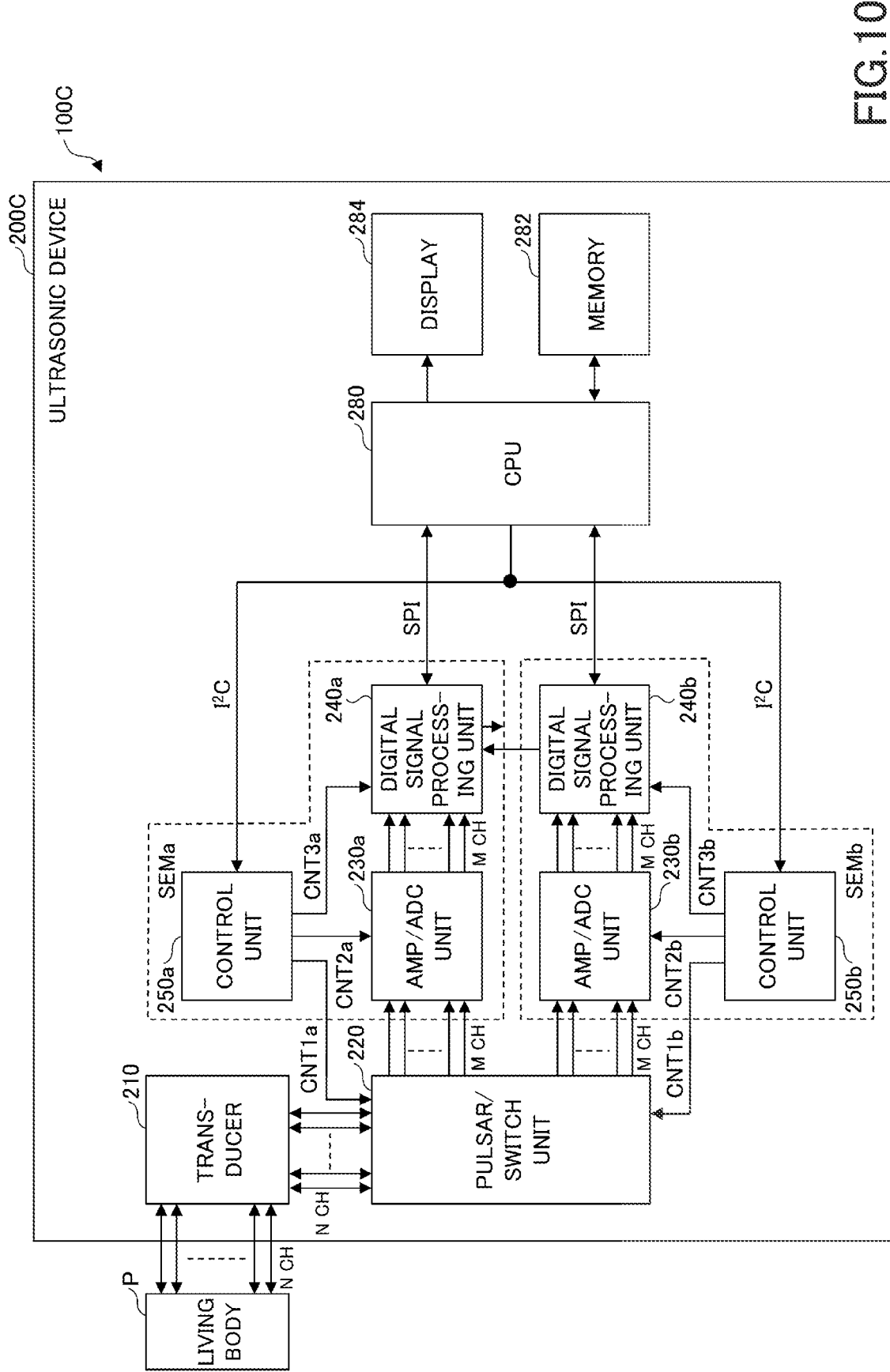
FIG. 10 is a block diagram illustrating an example of an ultrasonic diagnostic system that includes an ultrasonic device in a fourth embodiment.

FIG. 10 illustrates an example of an ultrasonic diagnostic system that includes an ultrasonic device in a fourth embodiment. Elements that are substantially the same as those in FIG. 1 are assigned the same reference numerals, and detailed description is omitted. In this embodiment, the ultrasonic diagnostic system 100C includes only an ultrasonic device 200C. In other words, the ultrasonic device 200C includes the functions of the terminal device 300 in FIG. 1.

The ultrasonic device 200C includes a transducer 210, a pulsar/switch unit 220, semiconductor devices SEMa and SEMb, a CPU 280, a memory 282, and a display 284. The CPU 280, the memory 282, and the display 284 are substantially the same as the CPU 320, the memory 330, and the display 340 of the terminal device 300 in FIG. 1, respectively. For example, the ultrasonic device 200A operates using a commercial power supply, and thereby, does not have a battery installed. Note that the display 284 may be connected to the outside of the ultrasonic device 200C.

For example, the probe of the ultrasonic device 200C includes only the transducer 210 among the elements illustrated in FIG. 10. Therefore, the probe having the transducer 210 built in is connected to the pulsar/switch unit 220 by a cable including N channels of signal lines. The configuration and functions of the semiconductor devices SEMa and SEMb are substantially the same as the configuration and functions of the semiconductor devices SEMa and SEMb in FIG. 2.

In this embodiment, the CPU 280 is connected to the control units 250a and 250b of the semiconductor devices SEMa and SEMb via an I²C interface bus. Therefore, the CPU 280 outputs a command to start or stop measurement of an ultrasonic image to the control units 250a and 250b, without an intervening wireless communication unit.

In addition, the CPU 280 is connected to the digital signal processing units 240a and 240b of the semiconductor devices SEMa and SEMb via an SPI bus. Therefore, the CPU 280 can receive image data from the digital signal processing units 240a and 240b, without an intervening wireless communication unit. However, in this embodiment, as in the embodiments illustrated in FIGS. 1 and 2, the digital signal processing unit 240b of the semiconductor device SEMb does not output image data. Operations of the ultrasonic device 200C are substantially the same as the operations described in FIGS. 2 and 3.

Note that elements other than the CPU 280, the memory 282, and the display 284 of the ultrasonic device 200C in FIG. 10 may be replaced with the corresponding elements other than the wireless communication unit 260 and the battery 270 of the ultrasonic device 200A illustrated in FIG. 4. In addition, elements other than the CPU 280, the memory 282, and the display 284 of the ultrasonic device 200C in FIG. 10 may be replaced with the corresponding elements other than the wireless communication units 260 and 261 and the battery 270 of the ultrasonic device 200B illustrated in FIG. 8. As above, also in this embodiment, substantially the same effects as in the embodiment described above can be obtained.

Note that the ultrasonic devices 200, 200A, 200B, and 200C described in the embodiments described above include multiple identical semiconductor devices SEM. In other words, the multiple ultrasonic devices 200, 200A, 200B, and 200C can be designed and manufactured using the same semiconductor device SEM. Note that the semiconductor devices SEMa and SEMb of the ultrasonic devices 200, 200B, and 200C can use the semiconductor device SEMa of the ultrasonic device 200A having three external terminals connected to the input of the phased addition unit 243a.

In addition, the ultrasonic devices 200, 200A, 200B, and 200C described in the embodiments described above can increase or decrease the number of reception channels for generating image data, by increasing or decreasing the number of the semiconductor devices SEM to be operated, and thereby, can obtain an ultrasonic image of desired resolution.

As above, the present inventive concept has been described based on the respective embodiments; note that the present disclosure is not limited to the requirements set forth in the embodiments described above. These requirements can be changed within a scope not to impair the gist of the present disclosure, and can be suitably defined according to applications.

It should be noted that,
the transducer 210 is an example of a plurality of oscillation elements;
the pulsar/switch unit 220 is an example of a switch; the AMP/ADC unit 230 is an example of a data generator;
the digital signal processing unit 240 is an example of a signal processor;
the delay adjustment unit 241 is an example of a delay adjuster;
the phased addition unit 242 is an example of a first adder;
the phased addition unit 243 is an example of a second adder;
the image generation unit 245 is an example of an image generator;
the control unit 250 is an example of a controller; and
the wireless communication unit 260/261 is an example of a wireless communicator.

What is claimed is:

1. A method of controlling an ultrasonic device that includes:
a plurality of oscillation elements configured to generate ultrasonic waves toward a subject, and generate voltages according to ultrasonic waves reflected by the subject,
a switch configured to select voltages generated by a first predetermined number of oscillation elements, from among the voltages generated by the plurality of oscillation elements, and
a plurality of semiconductor devices,
the method being executed by each of the plurality of semiconductors, comprising:
receiving a second predetermined number of voltages different from voltages received by other semiconductor devices, among a first predetermined number of voltages selected by the switch;
generating a second predetermined number of sets of time-series data, each of the sets indicating change in time of the received second predetermined number of voltages;
extracting sets of data of predetermined amounts of delays from the generated second predetermined number of sets of time-series data, respectively;
adding the extracted sets of data of the predetermined amounts of delays;
receiving addition results of data of the other semiconductor devices;
adding the addition result of data of said each of the plurality of semiconductors and the addition results of the data of the other semiconductor devices; and
generating image data based on the addition result of the data of said each of the plurality of semiconductors and the addition results of the data of the other semiconductor devices.

* * * * *